United States Patent
Kruglick

(10) Patent No.: US 9,501,137 B2
(45) Date of Patent: Nov. 22, 2016

(54) VIRTUAL MACHINE SWITCHING BASED ON PROCESSOR POWER STATES

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 204 days.

(21) Appl. No.: 14/373,897

(22) PCT Filed: Sep. 17, 2013

(86) PCT No.: PCT/US2013/060192
§ 371 (c)(1),
(2) Date: Jul. 22, 2014

(87) PCT Pub. No.: WO2015/041636
PCT Pub. Date: Mar. 26, 2015

(65) Prior Publication Data
US 2015/0227192 A1    Aug. 13, 2015

(51) Int. Cl.
*G06F 1/26* (2006.01)
*G06F 1/32* (2006.01)
*G06F 9/455* (2006.01)

(52) U.S. Cl.
CPC ............. *G06F 1/3296* (2013.01); *G06F 1/329* (2013.01); *G06F 1/3243* (2013.01); *G06F 9/45558* (2013.01); *G06F 2009/45575* (2013.01); *Y02B 60/1239* (2013.01); *Y02B 60/144* (2013.01)

(58) Field of Classification Search
CPC .... G06F 1/3243; G06F 1/329; G06F 1/3296; G06F 9/45558; G06F 2009/45575
See application file for complete search history.

(56) References Cited

U.S. PATENT DOCUMENTS

| | | | | |
|---|---|---|---|---|
| 8,261,284 B2 * | 9/2012 | Loeser | ..................... | G06F 9/462 710/260 |
| 8,886,862 B2 * | 11/2014 | Kagan | .................. | G06F 9/45558 710/260 |
| 2003/0101440 A1 * | 5/2003 | Hardin | ................... | G06F 9/4812 717/148 |
| 2005/0132363 A1 * | 6/2005 | Tewari | ................. | G06F 9/45558 718/1 |
| 2005/0132364 A1 * | 6/2005 | Tewari | ................... | G06F 9/5077 718/1 |
| 2007/0174597 A1 * | 7/2007 | Joy | ...................... | G06F 9/30127 712/228 |

(Continued)

FOREIGN PATENT DOCUMENTS

EP    2339462 A1    6/2011

OTHER PUBLICATIONS

"Blue Pill (software)," Accessed at http://web.archive.org/web/20130726235637/http://en.wikipedia.org/wiki/Blue_Pill_(software), Accessed on Jul. 21, 2014, pp. 4.

(Continued)

*Primary Examiner* — Mark Connolly
(74) *Attorney, Agent, or Firm* — Turk IP Law, LLC

(57) ABSTRACT

Technologies are generally provided to switch virtual machines based on processor power states. In some examples, a virtual machine manager (VMM) may determine that a processor configured to execute a first virtual machine (VM) is to execute a VM switch, and cause the processor to enter a low-power state and store a first VM state. The VMM, which may be a VM itself, may then replace the stored first VM state with a second VM state and cause the processor to exit the low-power state. When the processor exits the low-power state, it may load the second VM state and execute a second VM.

21 Claims, 9 Drawing Sheets

(56) References Cited

U.S. PATENT DOCUMENTS

| | | | |
|---|---|---|---|
| 2010/0037038 A1 | 2/2010 | Bieswanger et al. | |
| 2011/0307715 A1 | 12/2011 | Diab | |
| 2012/0191948 A1 | 7/2012 | Day, II et al. | |
| 2012/0216187 A1 | 8/2012 | Ben-Yehuda et al. | |
| 2013/0042242 A1* | 2/2013 | Kagan | G06F 9/45558 718/1 |
| 2013/0174144 A1* | 7/2013 | Cheng | G06F 9/45558 718/1 |
| 2013/0174151 A1* | 7/2013 | Nakajima | G06F 9/461 718/1 |
| 2013/0227685 A1 | 8/2013 | McGee | |
| 2013/0246776 A1* | 9/2013 | Farrell | G06F 9/3005 712/227 |

OTHER PUBLICATIONS

"BromiumTM™ micro-virtualization," Accessed at http://web.archive.org/web/20130520071404/http://www.bromium.com/misc/BromiumMicrovirtualization.pdf, Accessed on Jul. 21, 2014, pp. 10.

"CPU cache," Accessed at http://web.archive.org/web/20130907172454/http://en.wikipedia.org/wiki/CPU_cache, Accessed on Jul. 21, 2014, pp. 22.

"Improve Data Center Energy Efficiency," Accessed at http://web.archive.org/web/20130703152530/http://www.intel.com/content/www/us/en/data-center/energy-efficiency-it-data-center.html, Accessed on Jul. 21, 2014, pp. 3.

"Micro-Virtualization," Accessed at http://web.archive.org/web/20130220075552/http://www.bromium.com/technology/micro-virtualization.html, Accessed on Jul. 21, 2014, pp. 2.

Belpaire, G., and Hsu, N. T., "Formal Properties of Recursive Virtual Machine Architectures," In ACM SIGOPS Operating Systems Review, vol. 9, pp. 89-96, (1975).

Ben-Yehuda, M. et al., "The Turtles Project: Design and Implementation of Nested Virtualization," In Proceedings of the 9th USENIX Conference on Operating Systems Design and Implementation, No. 1-6, pp. 1-14 (2010).

Berghmans, O., "Nesting Virtual Machines in Virtualization Test Frameworks," In Master's Thesis, pp. 99 (2010).

Biemuller, S., "Hardware-Supported Virtualization for the L4 Microkernel," Diploma Thesis, Sep. 29, 2006, 9 pages.

Cohen, R., "Bromium Wants You to Forget About Security," posted Oct. 10, 2012, Accessed at http://web.archive.org/web/20121117105314/http://www.forbes.com/sites/reuvencohen/2012/10/10/bromium-wants-you-to-forget-about-security/, Accessed on Jul. 21, 2014, pp. 4.

Daly, D., and Cain, H. W., "Cache Restoration for Highly Partitioned Virtualized Systems," IEEE 18th International Symposium on High Performance Computer Architecture (HPCA), pp. 1-10, (2012).

Ha, A., "Bromium Raises $26.5M for Security Through Micro-Virtualization," posted on Jun. 20, 2012, Accessed at http://web.archive.org/web/20130908170540/http://techcrunch.com/2012/06/20/bromium-series-b-micro-virtualization/, Accessed on Jul. 21, 2014, pp. 2.

He, Q, "Nested Virtualization on Xen," Xen Summit Asia, pp. 13 (2009).

International Search Report and Written Opinion in International Patent Application No. PCT/US2013/60192 mailed Apr. 16, 2014.

Jones, M. T., "Nested virtualization for the next-generation cloud An introduction to nesting with KVM," developerWorks, Aug. 22, 2012, pp. 8.

Knuth, G., "Bromium vSentry now runs on Windows Server, but what's all this about supporting XP and VDI desktops, too?," posted on Dec. 12, 2012, Accessed at http://web.archive.org/web/20130530193740/http://www.brianmadden.com/blogs/gabeknuth/archive/2012/12/12/bromium-vsentry-now-runs-on-windows-server-but-what-s-all-this-about-supporting-xp-and-vdi-desktops-too.aspx, Accessed on Jul. 21, 2014, pp. 4.

Seshadri, A., et al., "SecVisor: a Tiny Hypervisor to Provide Lifetime Kernel Code Integrity for Commodity OSes," In ACM SIGOPS Operating Systems Review, vol. 41, No. 6, 1 page (2007).

Torres, G., "Everything You Need to Know About the CPU C-States Power Saving Modes," posted on Sep. 4, 2008, Accessed at http://web.archive.org/web/20120405175035/http://www.hardwaresecrets.com/article/611, Accessed on Jul. 21, 2014, pp. 2.

White, S., "High-Performance Power-Efficient X86-64 Server and Desktop ProcessorsUsing the core codenamed "Bulldozer"," Presented at HotChips, Aug. 23, 2011.

Winder, D., "Virtual servers are a security black hole," posted on Jan. 29, 2013, Accessed at http://web.archive.org/web/20130730105210/http://www.daniweb.com/hardware-and-software/networking/news/446517/virtual-servers-are-a-security-black-hole, Accessed on Jul. 21, 2014, pp. 3.

Zabaljauregui, M., "Hardware Assisted Virtualization: Intel Virtualization Technology," Buesnos Aires, Jun. 2008, pp. 54.

Lauer, H. C., and Wyeth, D., "A Recursive Virtual Machine Architecture," In Proceedings of the Workshop on Virtual Computer Systems, pp. 113-116 (1973).

* cited by examiner

COMPUTER PROGRAM PRODUCT 900

SIGNAL BEARING MEDIUM 902

904 AT LEAST ONE OF

ONE OR MORE INSTRUCTIONS FOR DETERMINING THAT A PROCESSOR CONFIGURED TO EXECUTE A FIRST VIRTUAL MACHINE IS TO EXECUTE A VIRTUAL MACHINE SWITCH;
    ONE OR MORE INSTRUCTIONS FOR CAUSING THE PROCESSOR TO ENTER A LOW-POWER STATE AND STORE A FIRST VIRTUAL MACHINE STATE;
    ONE OR MORE INSTRUCTIONS FOR REPLACING THE STORED FIRST VIRTUAL MACHINE STATE WITH A SECOND VIRTUAL MACHINE STATE; AND
    ONE OR MORE INSTRUCTIONS FOR CAUSING THE PROCESSOR TO EXIT THE LOW-POWER STATE AND EXECUTE A SECOND VIRTUAL MACHINE BY LOADING THE SECOND VIRTUAL MACHINE STATE.

| COMPUTER-READABLE MEDIUM 906 | RECORDABLE MEDIUM 908 | COMMUNICATIONS MEDIUM 910 |
|---|---|---|

FIG. 9

VIRTUAL MACHINE SWITCHING BASED ON PROCESSOR POWER STATES

CROSS-REFERENCE TO RELATED APPLICATION

This Application is the U.S. National Stage filing under 35 U.S.C. §371 of PCT Application Ser. No. PCT/US13/60192 filed on Sep. 17, 2013. The PCT application is hereby incorporated by reference in its entirety.

BACKGROUND

Unless otherwise indicated herein, the materials described in this section are not prior art to the claims in this application and are not admitted to be prior art by inclusion in this section.

Multi-level virtualization is a security concept, where each small software component within a machine has independently isolated resource access using virtualization without additional operating systems. The vision for such systems is to have a large number (e.g., thousands) of virtualized containers with individual virtualized containers around each operating system service, application, or web session such that they cannot modify each other or shared resources unless system policies give them the right to do so. Such multi-level virtualization (e.g., micro-virtualization) systems may be powerful and immune to conventional malware.

Conventional multi-level virtualization systems need to use hardware virtualization features, which may not currently be run inside virtual machines because hardware virtualization system events are delivered to the single lowest level virtual machine manager. Thus, multi-level virtualization security cannot be used inside current virtualized environments such as those in datacenter or cloud computing systems unless the datacenters switch back to non-virtualized server operation.

SUMMARY

The present disclosure generally describes techniques to switch virtual machines based on processor power states in a datacenter.

According to some examples, a method is provided to switch virtual machines based on processor power states. The method may include, upon determination that a processor configured to execute a first virtual machine is to execute a virtual machine switch, causing the processor to enter a low-power state and store a first virtual machine state, replacing the stored first virtual machine state with a second virtual machine state, and causing the processor to exit the low-power state and execute a second virtual machine by loading the second virtual machine state.

According to other examples, a virtual machine manager (VMM) is provided to switch virtual machines based on processor power states. The VMM may include a memory configured to store instructions and a processing module coupled to the memory. The processing module may be configured to determine that a processor configured to execute a first virtual machine is to execute a virtual machine switch, cause the processor to enter a low-power state and store a first virtual machine state, replace the stored first virtual machine state with a second virtual machine state, and cause the processor to exit the low-power state and execute a second virtual machine by loading the second virtual machine state.

According to further examples, a cloud-based datacenter is provided to switch virtual machines based on processor power states. The datacenter may include a first virtual machine (VM) and a second VM, each operable to be executed on one or more physical machines, and a datacenter controller. The datacenter controller may be configured to determine that a processor configured to execute the first VM is to execute a virtual machine switch, cause the processor to enter a low-power state and store a first virtual machine state, replace the stored first virtual machine state with a second virtual machine state, and cause the processor to exit the low-power state and execute the second VM by loading the second virtual machine state.

According to yet further examples, a computer readable medium may store instructions to switch virtual machines based on processor power states. The instructions may include, upon determination that a processor configured to execute a first virtual machine is to execute a virtual machine switch, causing the processor to enter a low-power state and store a first virtual machine state, replacing the stored first virtual machine state with a second virtual machine state, and causing the processor to exit the low-power state and execute a second virtual machine by loading the second virtual machine state.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 9 illustrates a block diagram of an example computer program product, all arranged in accordance with at least some embodiments described herein.

DETAILED DESCRIPTION

Figure 1:
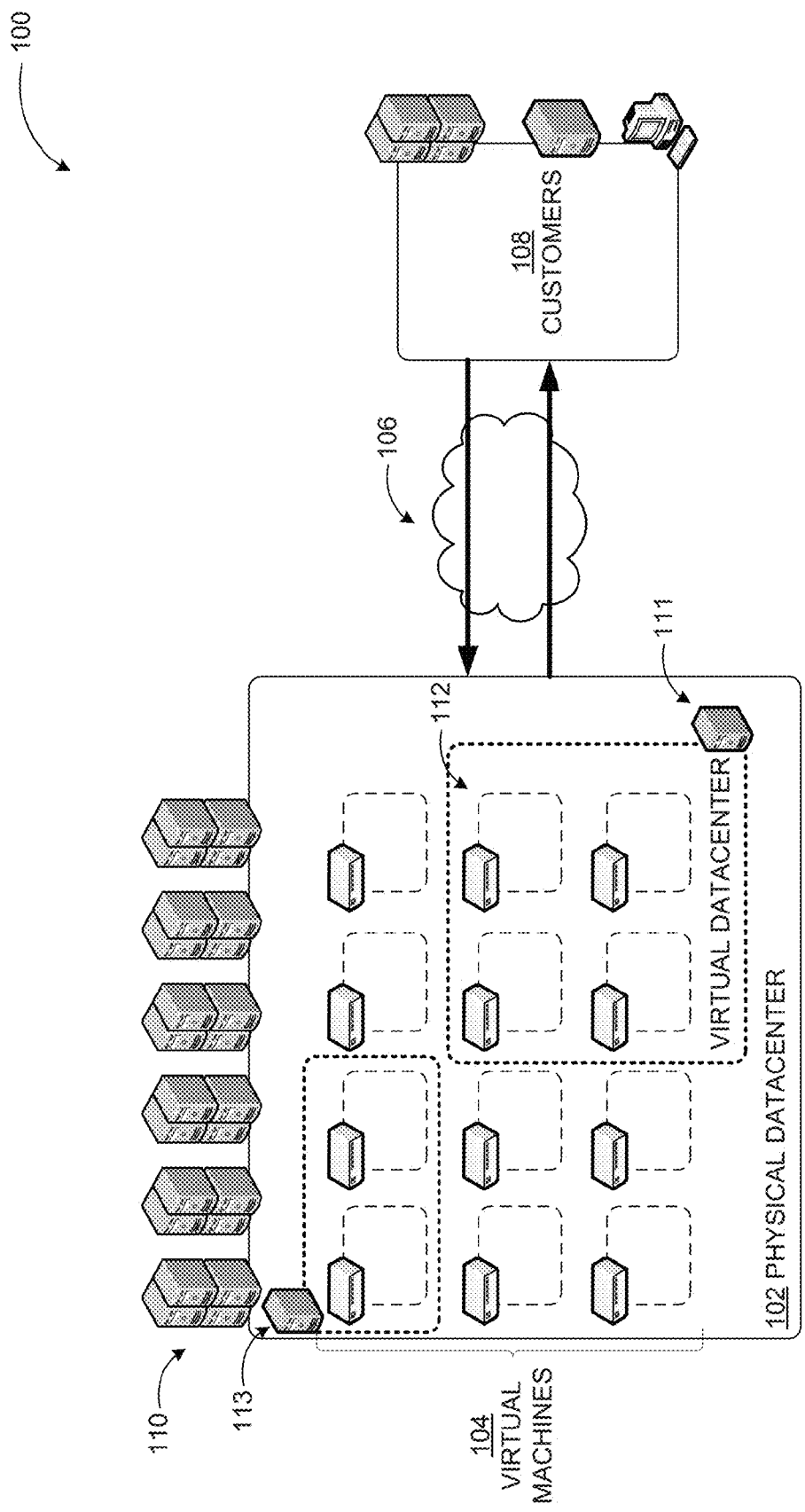
FIG. 1 illustrates an example datacenter-based system, where virtual machine switching based on processor power states may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to virtual machine switching based on processor power states.

Briefly stated, technologies are generally described to switch virtual machines based on processor power states. In some examples, a virtual machine manager (VMM) may determine that a processor configured to execute a first virtual machine (VM) is to execute a VM switch, and cause the processor to enter a low-power state and store a first VM state. The VMM, which may be a VM itself, may then replace the stored first VM state with a second VM state and cause the processor to exit the low-power state. When the processor exits the low-power state, it may load the second VM state and execute a second VM.

A datacenter as used herein refers to an entity that hosts services and applications for customers through one or more physical server installations and one or more virtual machines executed in those server installations. Customers of the datacenter, also referred to as tenants, may be organizations that provide access to their services for multiple users. One example configuration may include an online retail service that provides retail sale services to consumers (users). The retail service may employ multiple applications (e.g., presentation of retail goods, purchase management, shipping management, inventory management, etc.), which may be hosted by one or more datacenters. Thus, a consumer may communicate with those applications of the retail service through a client application such as a browser over one or more networks and receive the provided service without realizing where the individual applications are actually executed. This scenario contrasts with configurations where each service provider would execute their applications and have their users access those applications on the retail service's own servers physically located on retail service premises. One result of the networked approach described herein is that customers like the retail service may move their hosted services/applications from one datacenter to another without their users noticing a difference.

FIG. 1 illustrates an example datacenter-based system, where integration of hardware accelerators may be implemented, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the physical server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

In some examples, a nested virtualization architecture may be implemented in the physical datacenter 102. The nested virtualization architecture may simulate hardware nested virtualization on existing Central Processing Units (CPUs) using a new form of Virtual Machine Manager (VMM) swapping that completely eliminates exit-multiplication for security events among others. Multiple different VMMs may be swapped, where each VMM may have additional virtualization within them. Furthermore, manipulation of CPU power states and last level cache may be used to swap core state information including VMM information that is not swapped by previous virtualization hardware so that each of the (swapped) VMMs has direct native possession of the hardware virtualization events when running.

Figure 2:
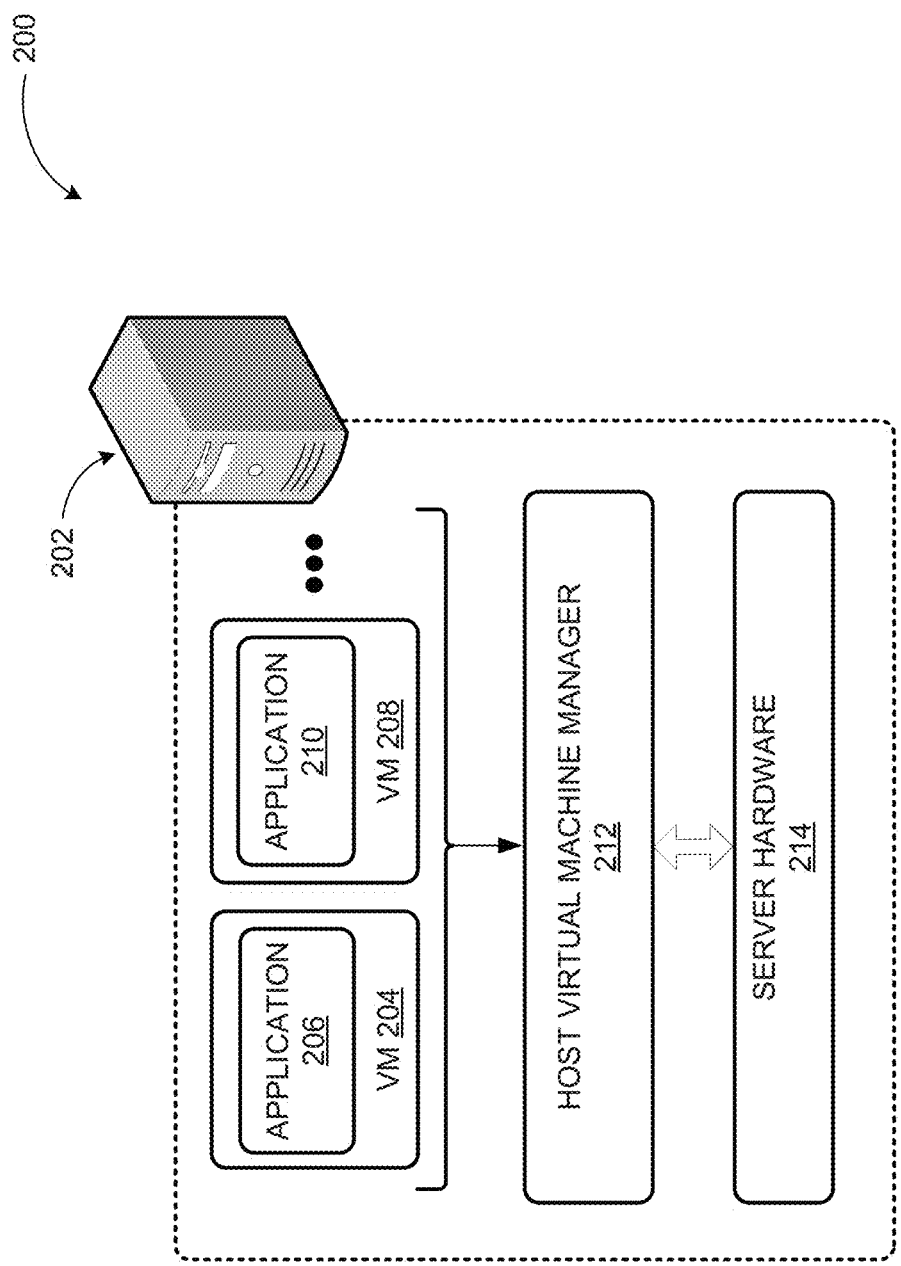
FIG. 2 illustrates an example system, where virtual machine switching may be implemented.

FIG. 2 illustrates an example system, where virtual machine switching may be implemented, arranged in accordance with at least some embodiments described herein.

As shown in a diagram 200, a physical server 202 (e.g., the physical servers 110, 111, or 113 in FIG. 1) may be configured to execute a number of virtual machines, such as a virtual machine 204, a virtual machine 208, and other virtual machines (not shown) on server hardware 214. Each of the virtual machines may implement one or more applications. For example, the virtual machine 204 may implement an application 206 and the virtual machine 208 may implement an application 210. A host virtual machine manager (VMM) 212 may be configured to manage the virtual machines executing on the server hardware 214. Restricted commands originating from the VM 204 (e.g., from the application 206), such as commands involving shared resources or hardware, may be passed to the host VMM 212. The host VMM 212 may then cause the commands to be executed and may then return the results of executing the commands (if any) to the VM 204. In some embodiments, the host VMM 212 may also load applications onto the virtual machines. For example, the host VMM 212 may load the application 206 and the application 210 onto the virtual machine 204 and the virtual machine 208, respectively.

As described above, isolating individual software components and services using multi-level virtualization may provide improved security. Since multi-level virtualization may involve the separate encapsulation of each individual software component, some implementations of multi-level virtualization may take the form of nested virtual machines. A nested virtual machine for multi-level virtualization may include a security virtual machine manager (VMM) configured to control a number of virtual machines or instances, where each instance may include an individual software component or service. In some embodiments, it may be desirable for a physical server or processor to execute multiple nested virtual machines using a host VMM in order to maintain relatively high usage of processing capacity.

Figure 3:
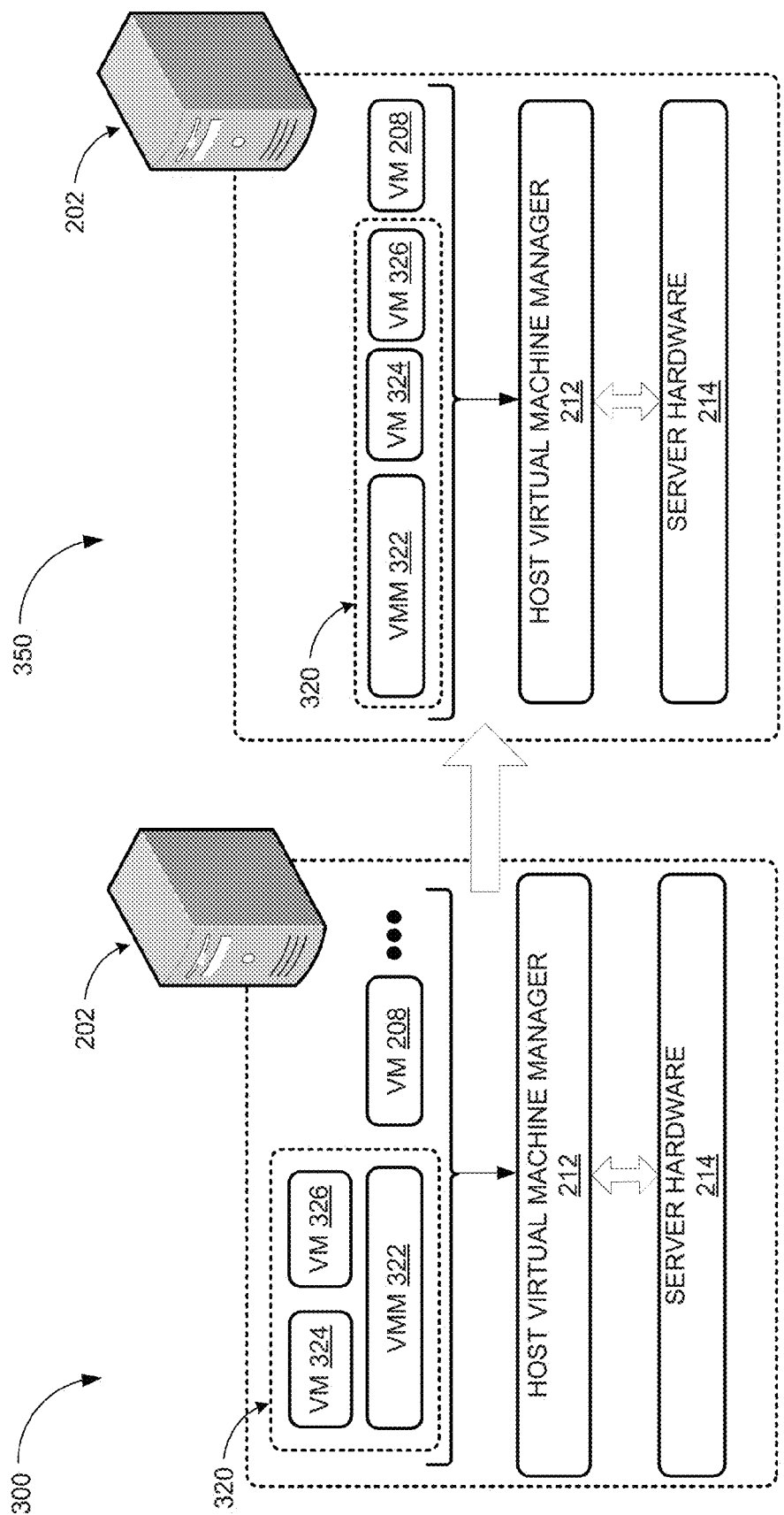
FIG. 3 illustrates how switching of nested virtual machines may be implemented in the system of FIG. 2.

FIG. 3 illustrates how switching of nested virtual machines may be implemented in the system of FIG. 2, arranged in accordance with at least some embodiments described herein.

A diagram 300 shares some similarities with the diagram 200 in FIG. 2, and similarly-numbered elements behave similarly. In the diagram 300, the host VMM 212 may be configured to manage VM 208 and a nested VM 320. The nested VM 320 may include a guest virtual machine manager 322, a guest VM 324, and a guest VM 326. The guest VMM 322 may be configured to manage the guest VMs 324/326 in the same way the host VMM is configured to manage the VM 208 and the nested VM 320.

The diagram 300 further depicts the nested VM 320 as a discrete virtual machine, where guest VMs 324/326 are managed by the guest VMM 322. However, in some embodiments the host VMM 212, which may have direct control of the server hardware 214, may manage the guest VMs 324/326 and the guest VMM 322. According to a diagram 350, the guest VMs 324/326 and the guest VMM 322, while still in the nested VM 320, may be implemented as VMs managed directly by the host VMM 212. Restricted commands originating from the guest VMs 324/326 intended for the guest VMM 322 may first be intercepted by the host VMM 212 because the host VMM 212 (not the guest VMM 322) may have direct control of the server hardware 214. The host VMM 212 may then forward the commands to the guest VMM 322. Any actions taken by the guest VMM 322 in response to those commands may also be intercepted by the host VMM 212, which may execute the actions on the server hardware 214 and then return the results (if any) to the guest VMM 322. Subsequently, any responses the guest VMM 322 makes to the original commands from the guest VMs 324/326 may again be intercepted by the host VMM 212, which may then forward the responses to the guest VMs 324/326. As a result, one restricted command from a guest VM may be multiplied into several interactions between the guest VM, the guest VMM, and the host VMM, because the guest VMM does not have direct hardware control and the host VMM does. In contrast, restricted commands from a VM managed directly by the host VMM 212 (e.g., the VM 208) may not be multiplied, because the host VMM 212 has direct control over the server hardware 214. As a result, nested VMs may be more resource-intensive and less efficient to implement than non-nested VMs.

In some embodiments, nested VMs (and their included guest VMs) may be configured to reduce the number of restricted commands used in order to increase efficiency. However, nested VMs implementing multi-level virtualization for security applications, as described above, may not be able to reduce the number of restricted commands used, because each command from an encapsulated software component may be a restricted command. In these situations, providing the VMMs in the nested VMs with direct hardware control may increase efficiency.

Figure 4:
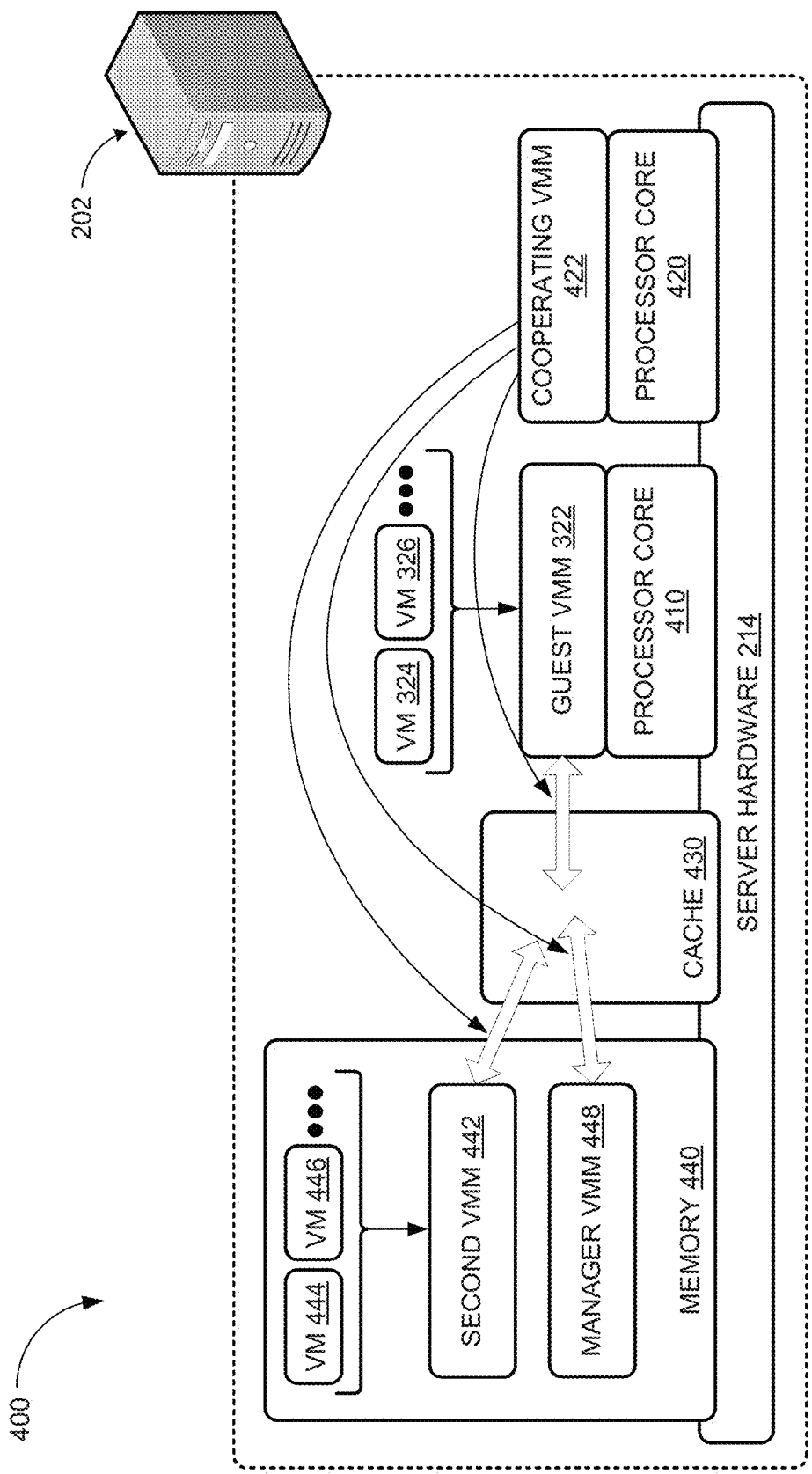
FIG. 4 illustrates an example system, where switching of virtual machines based on processor power states may be implemented.

FIG. 4 illustrates an example system, where switching of virtual machines based on processor power states may be implemented, arranged in accordance with at least some embodiments described herein.

As shown in a diagram 400, the server hardware 214 at the physical server 202 may include a processor core 410 and a processor core 420, each of which may be configured to execute a VMM or a nested VM at any particular time. In some embodiments, the processor cores 410 and 420 may both reside in the same physical package, or even on the same chip or integrated circuit. In other embodiments, more than two processor cores may be present on the server hardware 214. Initially, the guest VMM 322, which may manage the guest VMs 324/326, may be executed directly on the processor core 410 and may have direct hardware control of the processor core 410 and/or the server hardware 214. This is in direct contrast to FIG. 3, where the guest VMM 322 was managed by the host VMM 212, which in turn had direct hardware control.

The processor core 410 may be capable of entering one or more low-power processor states, such as a sleep state or a hibernation state, without affecting the power states of the server hardware 214 or the other processor core 420. The processor core 410 may be configured to enter the low-power processor state(s) based on a signal from software or applications being executed (e.g., from the guest VMM 322) or from another source (e.g., a cooperating VMM 422 executing on the processor core 420). In some embodiments, when the processor core 410 enters a low-power processor state, the processor core 410 may be configured to store its operating state or software being executed in a local cache 430 at the server hardware 214. For example, in response to determining that it is to enter a low-power processor state, the processor core 410 may pause the guest VMM 322 and/or the guest VMs 324/326 being executed and save the states of the guest VMM 322 and/or the guest VMs 324/326 in the cache 430. Subsequently, in response to determining that it is to exit the low-power processor state, the processor core 410 may retrieve the saved states of the guest VMM 322 and the guest VMs 324/326 from the cache 430 and then continue to execute them, without losing data.

The behavior of the processor core 410—while entering and exiting a low-power processor state—may be used to perform virtual machine switching. As described above, the processor core 410 may save the states of the guest VMM 322 and the guest VMs 324/326 in the cache 430 in response to determining that it is to enter a low-power processor state. Subsequently, the states of the guest VMM 322 and the guest VMs 324/326 in the cache 430 may be replaced with states of a second VMM 442 and its associated VMs 444/446 stored in a memory 440. For example, the states of the guest VMM 322 and the guest VMs 324/326 may be moved or copied to the memory 440, and the states of the second VMM 442 and its VMs 444/446 may be moved, copied, or otherwise loaded into the cache 430 from the memory 440. In some embodiments, the states of the second VMM 442 and its VMs 444/446 may be loaded into the same location in the cache 430 that the states of the guest VMM 322 and the guest VMs 324/326 were stored, in effect overwriting them. Subsequently, when the processor core 410 exits the low-power processor state, it may retrieve the newly loaded states of the second VMM 442 and its VMs 444/446 begin to execute the second VMM 442 and its VMs 444/446. As a result, the processor core 410 may in effect perform a virtual machine switch while entering and exiting the low-power processor state.

The memory 440 may also store a manager VMM 448 configured to manage the guest VMM 322 and the second VMM 442, and the processor core 410 may be able to switch to the manager VMM 448 in a similar fashion as described above. In some embodiments, the management logic executed by the manager VMM 448 may be distributed among the guest VMM 322, the second VMM 442, and/or other VMMs, and the manager VMM 448 itself may not be used. In some embodiments, the cooperating VMM 422 and its associated VMs 444/446 and/or the manager VMM 448 may be stored in a different cache or another portion of cache 430 instead of in memory 440.

Since the processor core 410 may enter a low-power processor state during the aforementioned virtual machine switching process, the processor core 410 may not be able to perform the virtual machine state replacement process as described above. In some embodiments, the processor core 420 may remain active and execute a cooperating VMM 422, which in turn may perform the virtual machine state replacement process. For example, the cooperating VMM 422 may cause the processor core 410 to enter the low-power processor state, thereby causing the processor core 410 to store the states of the guest VMM 322 and guest VMs 324/326 in the cache 430. The cooperating VMM 422 may then cause the cached states of the guest VMM 322 and guest VMs 324/326 to be stored in the memory 440 and cause VMM states stored in the memory 440 to replace the states of the guest VMM 322 and guest VMs 324/326 in the cache 430. For example, the cooperating VMM 422 may cause the states of the manager VMM 448 and/or the second VMM 442 and its VMs 444/446 to be stored in the cache 430.

As described above, one or more other processor cores may also be present on the server hardware 214. In some embodiments, the cooperating VMM 422 may also perform the virtual machine state replacement process described above for the other processor cores. In these embodiments, multiple processor cores (and their associated processes) may have access to the local cache 430, for example to store operating states such as the states of virtual machines and their associated instances.

In the above embodiments, the guest VMM 322 and the second VMM 442 (and optionally the manager VMM 448) may have access to the entirety of the memory 440 when executing on the processor core 410. To avoid conflicting memory usage and compromising security, the VMMs may communicate memory region ownership (i.e., which portions of memory belong to which VMM) between each other via, for example, the cooperating VMM 422. In some embodiments, memory may also be compartmentalized by maintaining a guest memory region ownership state record in the cache 430. For example, the cache 430 may store information about the guest VMs 324/326 (associated with the guest VMM 322) and the VMs 444/446 (associated with the second VMM 442) at the same time. When the state of the guest VMM 322 is stored into the cache 430, the guest VM information in the cache 430 may not be overwritten. Similarly, when the state of the guest VMM 322 in the cache 430 is replaced with the state of the second VMM 442, the guest VM information in the cache 430 may also not be overwritten. Since the guest VMM 322 and the second VMM 442 may know their own associated instances and only modify those instances, the guest VM information in the cache 430 pertaining to the other guest VMs (e.g., the VMs 444/446 when the guest VMM 322 is executing) may remain unchanged. As a result, memory may remain compartmentalized, and the various memory containers associated with the guest VMs may be preserved during the virtual machine switch.

Figure 5:
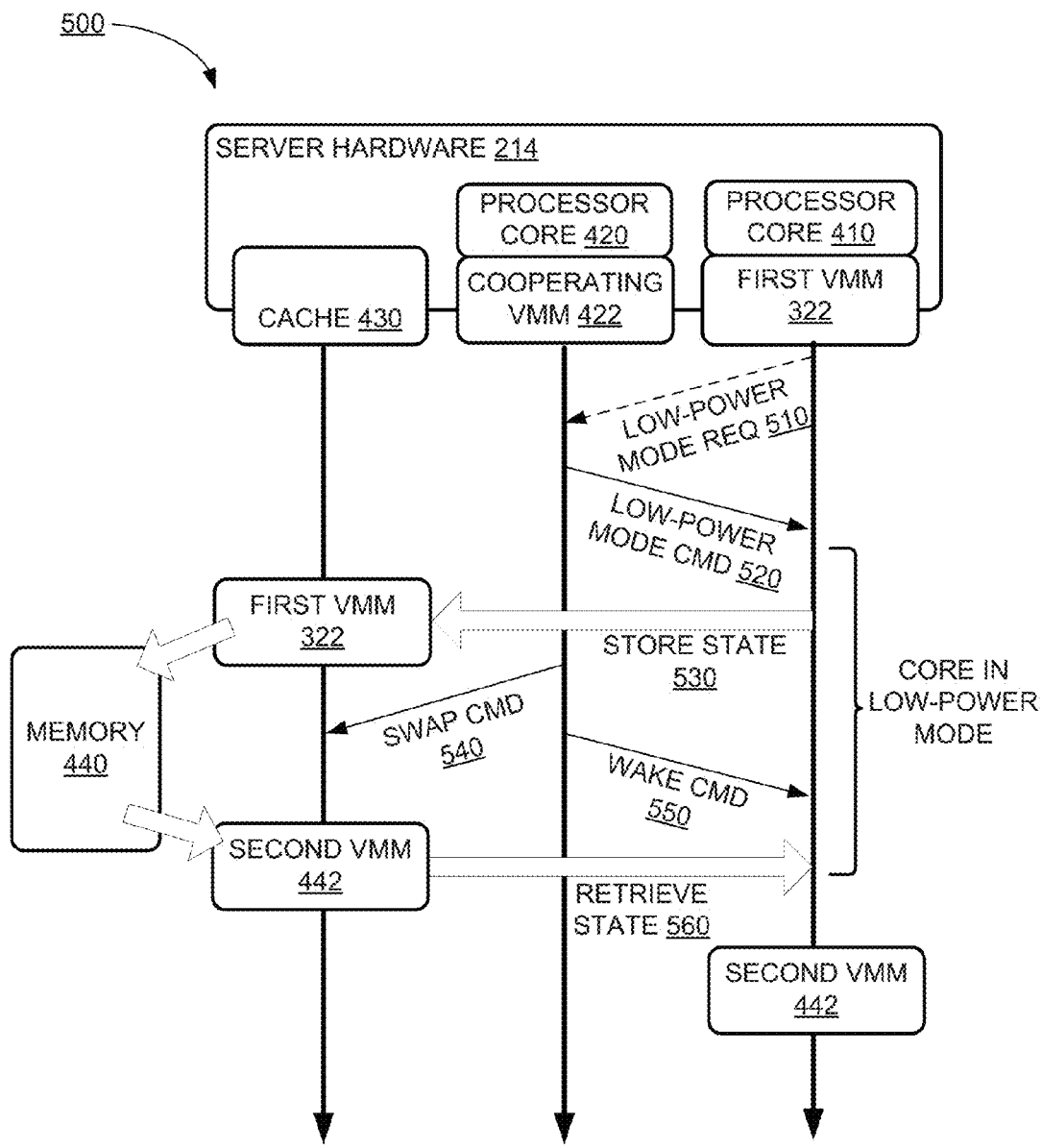
FIG. 5 illustrates an example process for the system of FIG. 4 to switch virtual machines based on processor power states.

FIG. 5 illustrates an example process for the system of FIG. 4 to switch virtual machines based on processor power states, arranged in accordance with at least some embodiments described herein.

A diagram 500 of FIG. 5 is a signal flow diagram for the processor-power-state-based virtual machine switching described in FIG. 4. As such, similarly-numbered elements behave similarly.

The virtual machine switching process may begin when the first VMM 322 being executed on the processor core 410 provides a low-power mode VMM swap request 510 to the cooperating VMM 422 being executed on the processor core 420. The first VMM 322 may provide the low-power mode request 510 in response to determination that it is awaiting some result (e.g., the completion of an I/O command) to continue operation. The cooperating VMM 422 may then provide a low-power mode command 520 to the processor core 410, either in response to the low-power mode request 510 (if present) or based on some other criteria (e.g., an allotted time for the first VMM 322 has expired, the processor core 410 is to enter the low-power mode due to low utilization, etc.). In some embodiments, the cooperating VMM 422 may send the low-power mode command 520 as an inter-processor interrupt signal. Inter-processor interrupt signals may be high-priority signals transmitted from one processor to another in a multi-processor system indicating a high-priority event. An inter-processor interrupt signal sent to a processor may "interrupt" the current operation of the processor.

Upon receiving the low-power mode command 520, the processor core 410 may proceed to store its operating state in the cache 430 in an operation 530. The operating state of the processor core 410 may include virtual machines it is currently executing, such as the first VMM 322 and its associated instances (e.g., the guest VMs 324/326), or any other suitable state information. Subsequently, the processor core 410 may enter a low-power mode.

After the processor core 410 stores the first VMM 322 and its associated instances in the cache 430, the cooperating VMM 422 may then transmit a swap command 540 to the cache 430. The swap command 540 may cause the cache 430 to transfer the stored first VMM 322 and its associated instances to the memory 440. The cache 430 may then load the second VMM 442 and its associated instances, replacing the stored first VMM 322 in the cache 430.

The cooperating VMM 422 may then send a wake command 550 to the processor core 410, for example as an inter-processor interrupt signal. Upon receiving the wake command 550, the processor core 410 may begin to exit the low-power mode. As part of exiting the low-power mode, the processor core 410 may retrieve its stored operating state from the cache 430 in an operation 560. As described above, the original operating state (the first VMM 322 and its associated instances) stored in the cache 430 may have been replaced with a different operating state (the second VMM 442 and its associated instances). As a result, when the processor core 410 retrieves its stored operating state in the operation 560 it may retrieve the second VMM 442 and its associated instances instead of the originally stored first VMM 322 and associated instances. Subsequently, the processor core 410 may exit the low-power mode and begin execution of the second VMM 442 and associated instances.

Figure 6:
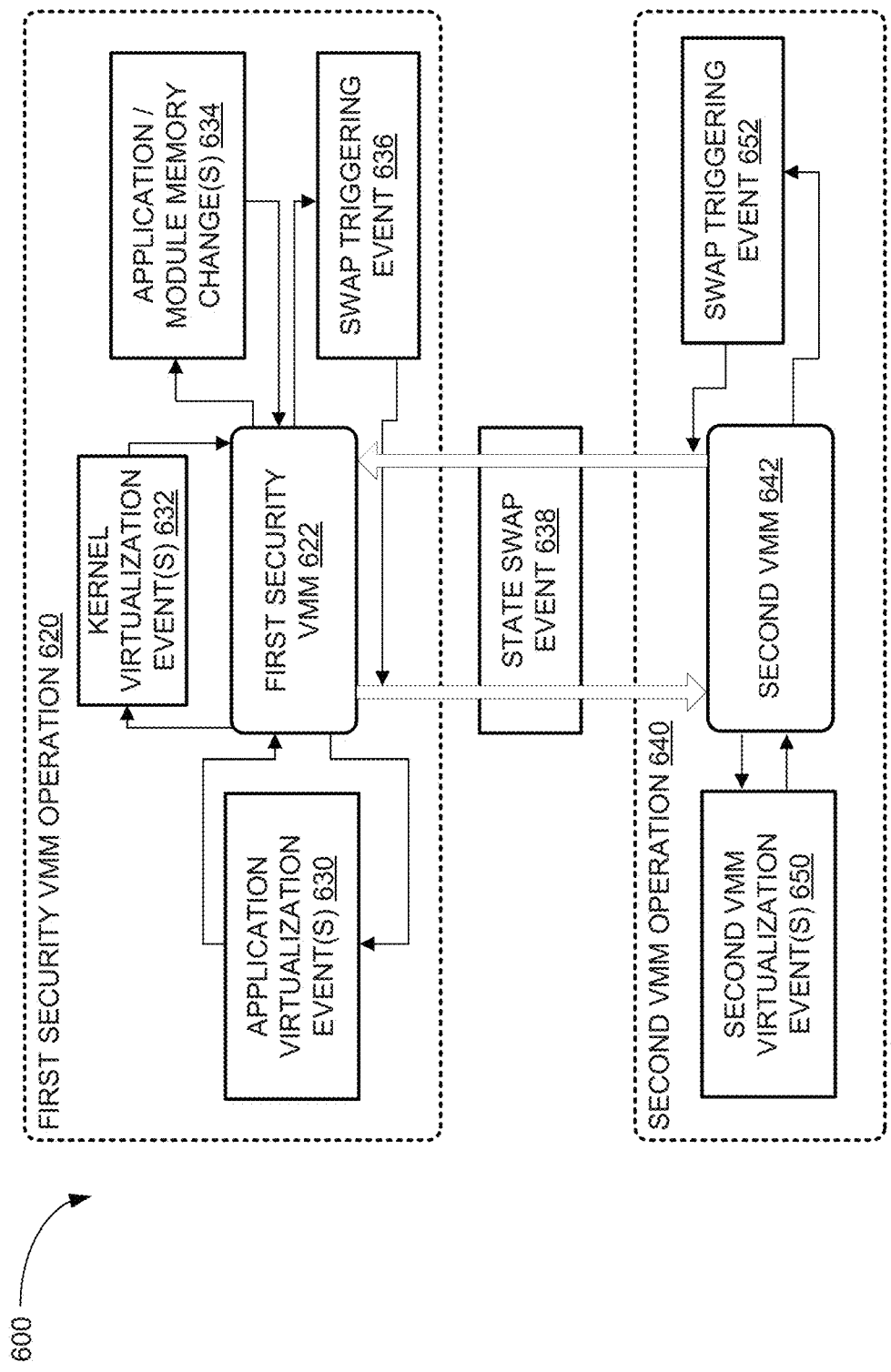
FIG. 6 illustrates an example diagram for switching of micro-virtualized virtual machines.

FIG. 6 illustrates an example diagram for switching of micro-virtualized virtual machines, arranged in accordance with at least some embodiments described herein.

As described above, multi-level virtualization implemented using nested virtual machines may be inefficient due to restricted command multiplication. In contrast, multi-level virtualization implemented using virtual machine switching based on processor power states described above in FIGS. 4 and 5 may not suffer from restricted command multiplication. According to a diagram 600, during a first security VMM operation 620, a first security VMM 622 (e.g., the guest VMM 322) may execute application virtualization event(s) 630, kernel virtualization event(s) 632, and/or application/module memory change(s) 634, all of which may involve restricted commands as described above. In cases where the first security VMM operation 620 occurs at a system using processor-power-state-based virtual machine switching, these events and their associated restricted commands may not cause restricted command multiplication, because the first security VMM 622 may be able to control directly the underlying hardware. When a swap triggering event 636 occurs, for example in response to processor entitlement expiration, a disk input/output event, a device delay, and/or a resource-or time-sharing event, a state swap event 638 may be performed, as described above in FIGS. 4 and 5. Subsequently, a second VMM operation 640 may be executed by a second VMM 642, and one or more second VMM virtualization events 650 may occur. Such events may include the execution of multiple conventional VMs, or even other multi-level virtualization events (e.g., the operation of other security VMMs). Subsequently, another swap triggering event 652 may occur, similar to the swap triggering event 636, resulting in the execution of the state swap event 638 and the re-execution of the first security VMM operation 620.

Figure 7:
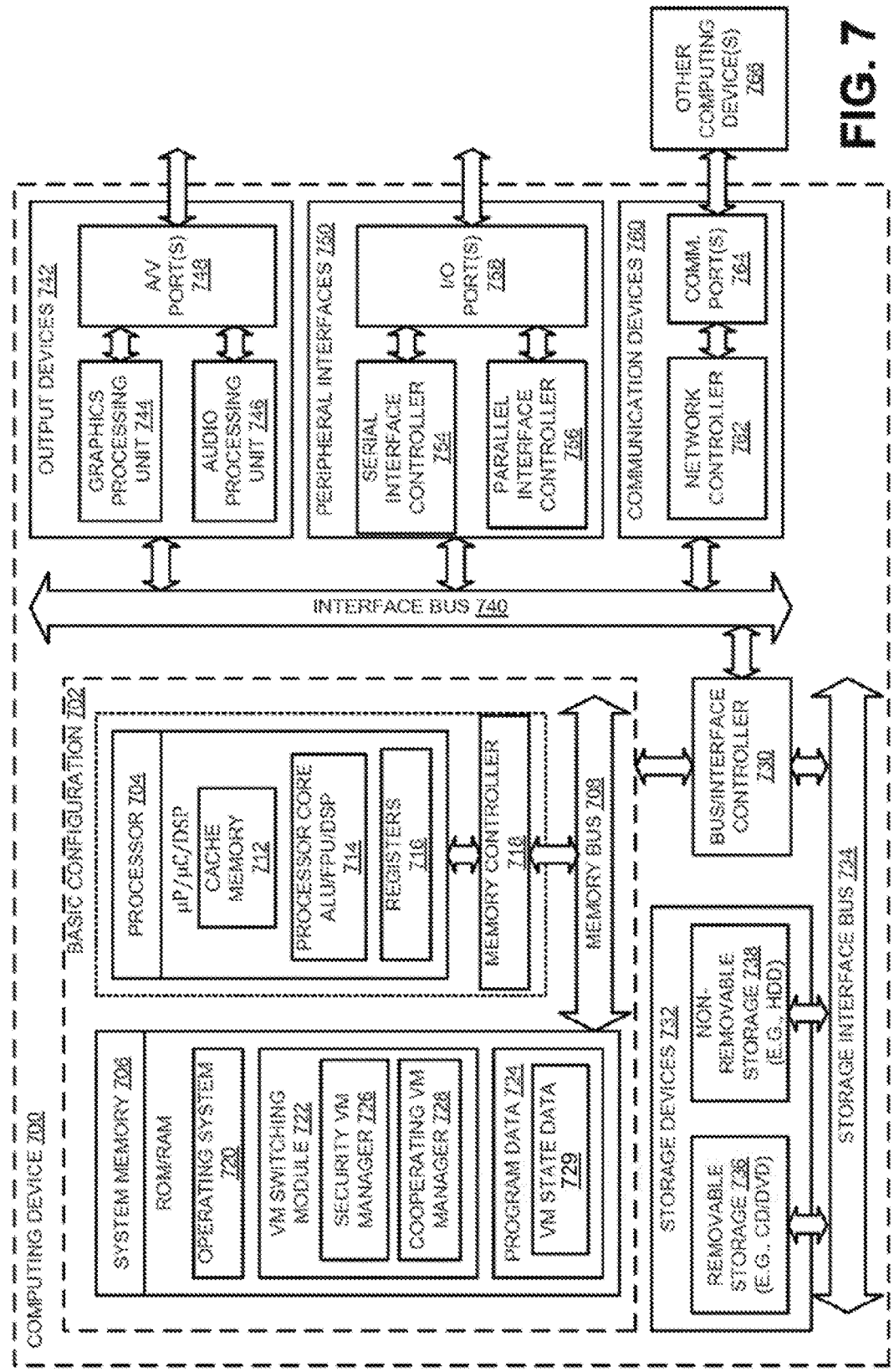
FIG. 7 illustrates a general purpose computing device, which may be used to provide virtual machine switching based on processor power states.

FIG. 7 illustrates a general purpose computing device, which may be used to provide virtual machine switching based on processor power states, arranged in accordance with at least some embodiments described herein.

For example, the computing device 700 may be used to switch virtual machines based on processor power states as described herein. In an example basic configuration 702, the computing device 700 may include one or more processors 704 and a system memory 706. A memory bus 708 may be used to communicate between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a cache memory 712, a processor core 714, and registers 716. The example processor core 714 may include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a virtual machine (VM) switching module 722, and program data 724. The VM switching module 722 may include a security VM manager 726 and a cooperating VM manager 728 to switch the security VM manager 726 as described herein. The program data 724 may include, among other data, VM state data 729 or the like, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (e.g., one or more output devices 742, one or more peripheral interfaces 750, and one or more communication devices 760) to the basic configuration 702 via the bus/interface controller 730. Some of the example output devices 742 include a graphics processing unit 744 and an audio processing unit 746, which may be configured to communicate to various external devices such as a display or speakers via one or more A/V ports 748. One or more example peripheral interfaces 750 may include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 760 includes a network controller 762, which may be arranged to facilitate communications with one or more other computing devices 766 over a network communication link via one or more communication ports 764. The one or more other computing devices 766 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Figure 8:
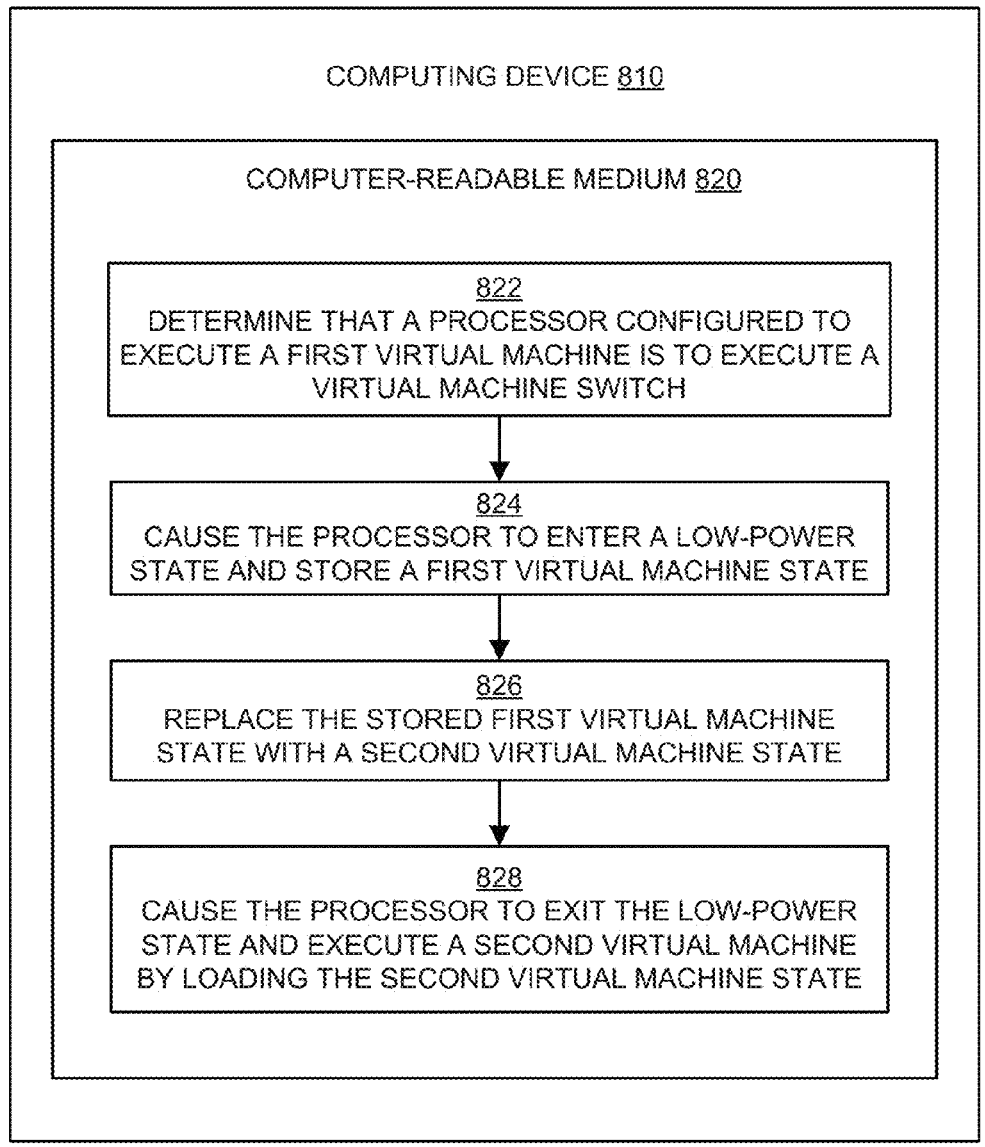
FIG. 8 is a flow diagram illustrating an example method to switch virtual machines based on processor power states that may be performed by a computing device such as the computing device in FIG. 7.

FIG. 8 is a flow diagram illustrating an example method to switch virtual machines based on processor power states that may be performed by a computing device such as the computing device in FIG. 7, arranged in accordance with at least some embodiments described herein.

Example methods may include one or more operations, functions or actions as illustrated by one or more of blocks 822, 824, 826, and/or 828, and may in some embodiments be performed by a computing device such as the computing device 700 in FIG. 7. The operations described in the blocks 822-828 may also be stored as computer-executable instructions in a computer-readable medium such as a computer-readable medium 820 of a computing device 810.

An example process for integrating hardware accelerators may begin with block 822, "DETERMINE THAT A PROCESSOR CONFIGURED TO EXECUTE A FIRST VIRTUAL MACHINE IS TO EXECUTE A VIRTUAL MACHINE SWITCH", where a cooperating virtual machine manager (e.g., the cooperating VMM 422) may determine that a processor executing a virtual machine is to execute a virtual machine switch, as described above. The cooperating VMM may receive a low-power mode request (e.g., the low-power mode request 510) from the virtual machine executing on the processor, or may itself determine that the processor is to execute a virtual machine switch.

Block 822 may be followed by block 824, "CAUSE THE PROCESSOR TO ENTER A LOW-POWER STATE AND STORE A FIRST VIRTUAL MACHINE STATE", where the cooperating VMM may cause the processor to enter a low-power state, as described above. For example, the cooperating VMM may send a low-power mode command (e.g., the low-power mode command 520) to the processor. When the processor begins to enter the low-power state, it may store its operating state (i.e., the state of the first virtual machine) in a local cache (e.g., the cache 430).

Block 824 may be followed by block 826, "REPLACE THE STORED FIRST VIRTUAL MACHINE STATE WITH A SECOND VIRTUAL MACHINE STATE", where the cooperating VMM may cause the stored processor operating state (i.e., the first virtual machine state) to be replaced with a second virtual machine state, as described above. For example, the cooperating VMM may cause the local cache (e.g., the cache 430) to transfer the stored processor operating state to a memory (e.g., the memory 440) and to load the second virtual machine state from the memory.

Finally, block 826 may be followed by block 828, "CAUSE THE PROCESSOR TO EXIT THE LOW-POWER STATE AND EXECUTE A SECOND VIRTUAL MACHINE BY LOADING THE SECOND VIRTUAL MACHINE STATE", where the cooperating VMM may cause the processor to exit the low-power state, as described above. For example, the cooperating VMM may send a wake command (e.g., the wake command 550) to the processor. When the processor begins to exit the low-power state, it may retrieve its operating state (formerly the first virtual machine state; now the second virtual machine state) from the local cache and begin execution, in effect performing a switch from the first virtual machine to the second virtual machine.

FIG. 9 illustrates a block diagram of an example computer program product, arranged in accordance with at least some embodiments described herein.

In some examples, as shown in FIG. 9, a computer program product 900 may include a signal bearing medium 902 that may also include one or more machine readable instructions 904 that, when executed by, for example, a processor may provide the functionality described herein. Thus, for example, referring to the processor 704 in FIG. 7, the accelerator assembly module 722 may undertake one or more of the tasks shown in FIG. 9 in response to the instructions 904 conveyed to the processor 704 by the signal bearing medium 902 to perform actions associated with switching virtual machines based on processor power states as described herein. Some of those instructions may include, for example, determining that a processor configured to execute a first virtual machine is to execute a virtual machine switch, causing the processor to enter a low-power state and store a first virtual machine state, replacing the stored first virtual machine state with a second virtual machine state, and/or causing the processor to exit the low-power state and execute a second virtual machine by loading the second virtual machine state, according to some embodiments described herein.

In some implementations, the signal bearing media 902 depicted in FIG. 9 may encompass computer-readable media 906, such as, but not limited to, a hard disk drive, a solid state drive, a Compact Disc (CD), a Digital Versatile Disk (DVD), a digital tape, memory, etc. In some implementations, the signal bearing media 902 may encompass recordable medium 908, such as, but not limited to, memory, read/write (R/W) CDs, R/W DVDs, etc. In some implementations, the signal bearing media 902 may encompass communications medium 910, such as, but not limited to, a digital and/or an analog communication medium (e.g., a fiber optic cable, a waveguide, a wired communications link, a wireless communication link, etc.). Thus, for example, the computer program product 900 may be conveyed to one or more modules of the processor 704 by an RF signal bearing medium, where the signal bearing media 902 is conveyed by the wireless communications medium 910 (e.g., a wireless communications medium conforming with the IEEE 802.11 standard).

According to some examples, a method is provided to switch virtual machines based on processor power states. The method may include, upon determination that a processor configured to execute a first virtual machine is to execute a virtual machine switch, causing the processor to enter a low-power state and store a first virtual machine state, replacing the stored first virtual machine state with a second virtual machine state, and causing the processor to exit the low-power state and execute a second virtual machine by loading the second virtual machine state.

According to some embodiments, determination that the processor is to execute the virtual machine switch may be based on a signal from the first virtual machine. The signal may be based on a disk input/output event, a resource-sharing event, and/or a time-sharing event. The method may further include causing the processor to store the first virtual machine state in a local cache. The local cache may be accessible by multiple processes and/or multiple processors. The method may further include replacing the stored first virtual machine state by storing the first virtual machine state in a memory and loading the second virtual machine state from the memory and/or causing the first virtual machine to communicate a memory region ownership to the second virtual machine to preserve at least one memory container in the memory during the virtual machine switch.

According to other embodiments, the method may include using an inter-processor interrupt signal in order to cause the processor to enter the low-power state and/or cause the processor to exit the low-power state. The low-power state may be a processor sleep state. The first virtual machine and/or the second virtual machine may include a virtual machine manager and at least one instance and/or a multi-level virtualization security virtual machine manager. The second virtual machine may include a virtual machine manager to manage the first virtual machine.

According to further embodiments, a virtual machine manager executed on another processor may perform at least one of determining that the processor is to execute a virtual machine switch, causing the processor to enter the low-power state, replacing the stored first virtual machine state, and/or causing the processor to exit the low-power state. At least one of the processor and the other processor may be a processor core, and the processor and the other processor may be located in the same physical package.

According to other examples, a virtual machine manager (VMM) is provided to switch virtual machines based on processor power states. The VMM may include a memory configured to store instructions and a processing module coupled to the memory. The processing module may be configured to determine that a processor configured to execute a first virtual machine is to execute a virtual machine switch, cause the processor to enter a low-power state and store a first virtual machine state, replace the stored first virtual machine state with a second virtual machine state, and cause the processor to exit the low-power state and execute a second virtual machine by loading the second virtual machine state.

According to some embodiments, the processing module may be further configured to determine that the processor is to execute the virtual machine switch based on a signal from the first virtual machine. The signal may be based on a disk input/output event, a resource-sharing event, and/or a time-sharing event. The processing module may be further configured to cause the processor to store the first virtual machine state in a local cache. The local cache may be accessible by multiple processes and/or multiple processors. The processing module may be further configured to replace the stored first virtual machine state by storing the first virtual machine state in the memory and loading the second virtual machine state from the memory and/or cause the first virtual machine to communicate a memory region ownership to the second virtual machine to preserve at least one memory container in the memory during the virtual machine switch.

According to other embodiments, the processing module may be further configured to use an inter-processor interrupt signal to cause the processor to enter the low-power state and/or cause the processor to exit the low-power state. The low-power state may be a processor sleep state. The first virtual machine and/or the second virtual machine may include a virtual machine manager and at least one instance and/or a multi-level virtualization security virtual machine manager. The second virtual machine may include a virtual machine manager to manage the first virtual machine.

According to further embodiments, the processing module may be further configured to execute on another processor. At least one of the processor and the other processor may be a processor core, and the processor and the other processor may be located in the same physical package.

According to further examples, a cloud-based datacenter is provided to switch virtual machines based on processor power states. The datacenter may include a first virtual machine (VM) and a second VM, each operable to be executed on one or more physical machines, and a datacenter controller. The datacenter controller may be configured to determine that a processor configured to execute the first VM is to execute a virtual machine switch, cause the processor to enter a low-power state and store a first virtual machine state, replace the stored first virtual machine state with a second virtual machine state, and cause the processor to exit the low-power state and execute the second VM by loading the second virtual machine state.

According to some embodiments, the controller may be further configured to determine that the processor is to execute the virtual machine switch based on a signal from the first VM. The signal may be based on a disk input/output event, a resource-sharing event, and/or a time-sharing event. The controller may be further configured to cause the processor to store the first virtual machine state in a local cache. The local cache may be accessible by multiple processes and/or multiple processors. The controller may be further configured to replace the stored first virtual machine state by storing the first virtual machine state in the memory and loading the second virtual machine state from the memory and/or cause the first VM to communicate a memory region ownership to the second VM to preserve at least one memory container in the memory during the virtual machine switch.

According to other embodiments, the controller may be further configured to use an inter-processor interrupt signal to cause the processor to enter the low-power state and/or cause the processor to exit the low-power state. The low-power state may be a processor sleep state. The first VM and/or the second VM may include a virtual machine manager and at least one instance and/or a multi-level virtualization security virtual machine manager. The second VM may include a virtual machine manager to manage the first VM.

According to further embodiments, the controller may be further configured to execute on another processor. At least one of the processor and the other processor may be a processor core, and the processor and the other processor may be located in the same physical package.

According to yet further examples, a computer readable medium may store instructions to switch virtual machines based on processor power states. The instructions may include, upon determination that a processor configured to execute a first virtual machine is to execute a virtual machine switch, causing the processor to enter a low-power state and store a first virtual machine state, replacing the stored first virtual machine state with a second virtual machine state, and causing the processor to exit the low-power state and execute a second virtual machine by loading the second virtual machine state.

According to some embodiments, determination that the processor is to execute the virtual machine switch may be based on a signal from the first virtual machine. The signal may be based on a disk input/output event, a resource-sharing event, and/or a time-sharing event. The instructions may further include causing the processor to store the first virtual machine state in a cache. The cache may be accessible by multiple processes and/or multiple processors. The instructions may further include replacing the stored first virtual machine state by storing the first virtual machine state in a memory and loading the second virtual machine state from the memory and/or causing the first virtual machine to communicate a memory region ownership to the second virtual machine to preserve at least one memory container in the memory during the virtual machine switch.

According to other embodiments, the instructions may include using an inter-processor interrupt signal in order to cause the processor to enter the low-power state and/or cause the processor to exit the low-power state. The low-power state may be a processor sleep state. The first virtual machine and/or the second virtual machine may include a virtual machine manager and at least one instance and/or a multi-level virtualization security virtual machine manager. The second virtual machine may include a virtual machine manager to manage the first virtual machine.

According to further embodiments, a virtual machine manager executed on another processor may perform at least one of determining that the processor is to execute a virtual machine switch, causing the processor to enter the low-power state, replacing the stored first virtual machine state, and/or causing the processor to exit the low-power state. At least one of the processor and the other processor may be a processor core, and the processor and the other processor may be located in the same physical package.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to switch virtual machines based on processor power states, the method comprising:
    upon determination that a processor configured to execute a first virtual machine is to execute a virtual machine switch, wherein the determination that the processor is to execute the virtual machine switch is based on a signal from the first virtual machine:
        causing the processor to enter a low-power state and store a first virtual machine state, wherein the low-power state is a processor sleep state;
        replacing the stored first virtual machine state with a second virtual machine state; and
        causing the processor to exit the low-power state and execute a second virtual machine by loading the second virtual machine state.

2. The method of claim 1, further comprising replacing the stored first virtual machine state by storing the first virtual machine state in a memory and loading the second virtual machine state from the memory.

3. The method of claim 2, farther comprising causing the first virtual machine to communicate a memory region ownership to the second virtual machine to preserve at least one memory container in the memory during the virtual machine switch.

4. The method of claim 1, further comprising using an inter-processor interrupt signal in order to at least one of:
    cause the processor to enter the low-power state; and
    cause the processor to exit the low-power state.

5. The method of claim 1, wherein at least one of the first virtual machine and the second virtual machine includes a virtual machine manager and at least one instance.

6. The method of claim 1, wherein at least one of the first virtual machine and the second virtual machine includes a multi-level virtualization security virtual machine manager.

7. The method of claim 1, wherein a virtual machine manager executed on another processor performs at least one of:
    determining that the processor is to execute a virtual machine switch;
    causing the processor to enter the low-power state;
    replacing the stored first virtual machine state; and
    causing the processor to exit the low-power state.

8. The method of claim 7, wherein at least one of the processor and the other processor is a processor core.

9. The method of claim 8, wherein the processor and the other processor are located in the same physical package.

10. A virtual machine manager (VMM) configured to switch virtual machines based on processor power states, the VMM comprising:
    a memory configured to store instructions; and
    a processing module coupled to the memory, the processing module configured to:
        determine that a processor configured to execute a first virtual machine is to execute a virtual machine switch based on a signal from the first virtual machine, wherein the signal is based on at least one of a disk input/output event, a resource-sharing event, and a time-sharing event;
cause the processor to enter a low-power state and store a first virtual machine state;
replace the stored first virtual machine state with a second virtual machine state;
cause the processor to exit the low-power state and execute a second virtual machine by loading the second virtual machine state, wherein the second virtual machine includes a virtual machine manager configured to manage the first virtual machine; and
execute processes on another processor, wherein at least one of the processor and the other processor is a processor core.

11. The VMM of claim 10, wherein the processing module is further configured to replace the stored first virtual machine state by storing the first virtual machine state in the memory and loading the second virtual machine state from the memory.

12. The VMM of claim 11, wherein the processing module is further configured to cause the first virtual machine to communicate a memory region ownership to the second virtual machine to preserve at least one memory container in the memory during the virtual machine switch.

13. The VMM of claim 10, wherein the processing module is further configured to use an inter-processor interrupt signal to cause the processor to enter the low-power state and/or cause the processor to exit the low-power state.

14. The VMM of claim 10, wherein at least one of the first virtual machine and the second virtual machine includes a virtual machine manager and at least one instance.

15. The VMM of claim 10, wherein at least one of the first virtual machine and the second virtual machine includes a multi-level virtualization security virtual machine manager.

16. The VMM of claim 10, wherein the processor and the other processor are located in the same physical package.

17. A cloud-based datacenter configured to switch virtual machines based on processor power states, the datacenter comprising:

a first virtual machine (VM) and a second VM, each operable to be executed on one or more physical machines; and
a datacenter controller configured to:
determine that a processor configured to execute a first VM is to execute a virtual machine switch;
cause the processor to enter a low-power state and store a first virtual machine state;
replace the stored first virtual machine state with a second virtual machine state by storing the first virtual machine state in a memory and loading the second virtual machine state from the memory;
cause the first VM to communicate a memory region ownership to the second VM to preserve at least one memory container in the memory during the virtual machine switch;
cause the processor to exit the low-power state and execute the second VM by loading the second virtual machine state; and
cause the processor to store the first virtual machine in a local cache, wherein the local cache is accessible by at least one of a plurality of processes and a plurality of processors.

18. The datacenter of claim 17, wherein the controller is further configured to use an inter-processor interrupt signal to cause the processor to enter the tow-power state and/or cause the processor to exit the low-power state.

19. The datacenter of claim 17, wherein at least one of the first VM and the second VM includes a virtual machine manager and at least one instance.

20. The datacenter of claim 17, wherein at least one of the first VM and the second VM includes a multi-level virtualization security virtual machine manager.

21. The datacenter of claim 17, wherein the processor and another processor are located in the same physical package.

* * * * *

UNITED STATES PATENT AND TRADEMARK OFFICE
CERTIFICATE OF CORRECTION

PATENT NO. : 9,501,137 B2  
APPLICATION NO. : 14/373897  
DATED : November 22, 2016  
INVENTOR(S) : Kruglick Page 1 of 1

It is certified that error appears in the above-identified patent and that said Letters Patent is hereby corrected as shown below:

In the Specification

In Column 1, Line 8, delete "§371" and insert -- § 371 --, therefor.

In the Claims

In Column 18, Line 31, in Claim 3, delete "farther" and insert -- further --, therefor.

In Column 20, Line 28, in Claim 18, delete "tow-power" and insert -- low-power --, therefor.

Signed and Sealed this
Eighteenth Day of April, 2017

Michelle K. Lee
*Director of the United States Patent and Trademark Office*